United States Patent [19]

Uehara

[11] Patent Number: 5,375,019
[45] Date of Patent: Dec. 20, 1994

[54] PICTURE ENHANCING CIRCUIT

[75] Inventor: Kenji Uehara, Kanagawa, Japan

[73] Assignee: Sony Corporation, Tokyo, Japan

[21] Appl. No.: 15,910

[22] Filed: Feb. 10, 1993

[30] Foreign Application Priority Data

Feb. 12, 1992 [JP] Japan .................................. 4-025001

[51] Int. Cl.⁵ .............................. G11B 5/09; G11B 5/00
[52] U.S. Cl. .......................................... 360/51; 360/32; 360/48
[58] Field of Search ..................... 360/10.1, 32, 35.1, 360/48, 49, 51, 53; 358/310, 312, 335

[56] References Cited

U.S. PATENT DOCUMENTS

| | | | |
|---|---|---|---|
| 4,758,902 | 7/1988 | Okamoto et al. | 360/53 X |
| 4,791,499 | 12/1988 | Mester | 360/10.3 |
| 4,799,113 | 1/1989 | Murakami | 360/32 |
| 4,837,767 | 6/1989 | Hartwell et al. | 360/53 X |
| 4,858,035 | 8/1989 | Hakawa | 360/51 |
| 4,862,295 | 8/1989 | Tanaka et al. | 360/48 |
| 5,187,615 | 2/1993 | Miyazaubi et al. | 360/51 X |

FOREIGN PATENT DOCUMENTS 2194851 3/1988 United Kingdom .

Primary Examiner—Donald Hajec
Assistant Examiner—Le Thien Minh
Attorney, Agent, or Firm—Jay H. Maioli

[57] ABSTRACT

A picture enhancing circuit for a reproduced picture signal includes a field memory and a circuit for writing data into the memory, in which the reproduced picture signal is in the form of sync blocks made up of sync data and picture data. After sync detection is performed, the content of the sync data is reset to zero and written into the memory along with the picture data, and each time the sync data and picture data are read out from the field memory the content of the sync data is updated. The contents of the sync data indicate the number of times that the picture data has been read out from the memory and, thus, its age. This age is used to determine whether the picture data can be used or whether it should be interpolated before use.

15 Claims, 9 Drawing Sheets

Fig. 1. (PRIOR ART)
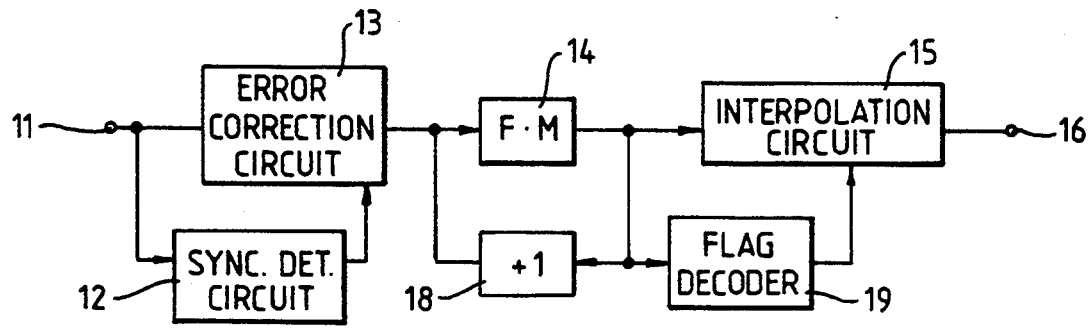
Fig. 2.
Fig. 4. CONTENTS OF FIELD MEMORY 14
Fig. 4A.
| SYNC FLAG (SYNC DATA) | | |
|---|---|---|
| 00 000 000 | ID | DATA |
| 00 000 000 | ID | DATA |
| 00 000 000 | ID | DATA |
| | | |
Fig. 4B.
| 00 000 001 | ID | DATA |
|---|---|---|
| 00 000 000 | ID | DATA |
| 00 000 001 | ID | DATA |
| | | |

CONTENTS OF FIELD MEMORY 14

| DATA |
|------|
| DATA |
| DATA |
| ⋮ |

| SYNC | ID | DATA |
|------|----|----|
| SYNC | ID | DATA |
| SYNC | ID | DATA |
| ⋮ | ⋮ | ⋮ |

| SYNC | DATA |
|------|------|
| SYNC | DATA |
| SYNC | DATA |
| ⋮ | ⋮ |

1. TAPE RUNNING DIRECTION
2. ROTATING DIRECTION

Fig. 12.
(PRIOR ART)

CONTENTS OF SYNC FLAG MEMORY (17)

1 SYNC FLAG (OF 8 BITS)

| | |
|---|---|
| 1 | |
| 2 | |
| 3 | |
| ⋮ | ⋮ |
| i | 000 000 00 |
| | |
| n | |

SYNC BLOCK NO. 2

Fig. 13.
(PRIOR ART)

CONTENTS OF SYNC FLAG MEMORY (17)

| | |
|---|---|
| 1 | |
| 2 | |
| 3 | |
| ⋮ | ⋮ |
| i | 000 000 01 |
| | |
| n | |

PICTURE ENHANCING CIRCUIT

BACKGROUND OF THE INVENTION

1. Field of the Invention.

The present invention relates to a picture enhancing circuit for use with digital video tape recorders (VTR's).

2. Description of the Prior Art.

Editing on digital VTR's often involves varying the playback speed and can involve playing back the tape at a speed higher than normal reproduction speed. In such a variable speed reproduction mode, the magnetic head of the machine does not follow the path of the originally recorded diagonal tracks on the tape but, as shown by the broken line in FIG. 8 of the accompanying drawings, runs across the tracks (shown in solid line).

Thus under the variable speed reproduction mode, recorded data on the tape is reproduced from a plurality of tracks thereof depending on the actual speed. Suppose that a magnetic head 3 attached to a rotating drum 2 is used to record and reproduce signals as shown in FIG. 9 and that a plurality of sync blocks constitute a one-track field signal as depicted in FIG. 10. During playback the reproduced field signal is written to a field memory or the like in units of sync blocks and a single picture is produced by reading the sync blocks one-by-one from the field memory.

The data written to the field memory is held unchanged unless and until new data is written thereto. If the field signal reproduced by the magnetic head 3 has a corresponding reproduced sync block, the whole corresponding sync block is replaced by the new sync block. However where the playback speed is varied from the normal speed, not all of the recorded data is reproduced and so some data in the field memory will not be updated. It follows that where the data of the same sync block in successive pictures is not encountered for a certain period of time because of the varying speed of reproduction, the picture data of the old sync block is used as the reproduced picture signal. This means that mutually uncorrelated items of data will be utilized to construct the reproduced picture. This can result in reproduced pictures being poorly animated or appearing dragged across the screen, thereby drastically deteriorating the quality and degree of recognition of reproduced pictures.

The degraded correlation between data items may be somewhat alleviated by using interpolation depending on whether the sync block data about to be used is new or old as proposed by the present assignee in U.S. Pat. No. 4,799,113. The alleviated correlation enhances the degree of reproduced picture quality.

FIG. 11 is a block diagram of the prior art picture enhancing circuit. The enhancing circuit of FIG. 11 comprises a single reproduction system that uses a pair of reproducing magnetic heads shown in FIG. 9. In FIG. 11, a reproduced field signal input through a terminal 11 is sent to a sync detection circuit 12 and an error correction circuit 13 (e.g. an inner code corrector). The sync detection circuit 12 detects sync data inserted in each sync block. The detected sync data is used by the error correction circuit 13 to correct the reproduced field signal.

If the sync data has no error or if the error found therein is of a correctable nature, ID information inserted in the sync block is relied on to write to a field memory 14 the picture data from that sync block.

The picture data read from the field memory 14 is fed to an interpolation circuit 15. Interpolation is carried out only when the interpolation conditions, to be described later, are met where the picture data of an old sync block is used. Otherwise the picture data is allowed to pass through the field interpolation circuit 15 unprocessed. The reproduced output interpolated or passed on unprocessed appears at a terminal 16.

A sync flag memory 17 has as many memory areas as the sync blocks of a field. When picture data is written to the field memory 14, a sync flag, e.g. of eight bits, is written to the memory area corresponding to the sync block of the picture data or more specifically the contents of the sync flag in the applicable area are reset e.g. to zero.

When the picture data of the corresponding sync block is read from the field memory 14, the sync flag is also read from the sync flag memory 17 synchronously with the picture data read operation. The flag is incremented by 1 by an incrementer 18, and then the flag is rewritten to the same sync block memory area.

For example, if the picture data of a sync block i is read from the field memory 14, the corresponding sync flag (see FIG. 12) is incremented by 1. The updated sync flag is written to the same sync block memory area i, as shown in FIG. 13. As mentioned when new picture data is written to the field memory 14, the corresponding sync flag is reset accordingly which causes the whole contents of the sync flag to be reset to 0, as depicted in FIG. 12.

The sync flag read from the memory 17 is passed on to a flag decoder 19 for determination of the flag value. If the flag value is found to exceed a predetermined reference value (e.g., 30–50), indicating that it is very old data which has been used several times and not overwritten by new data, a "1" is output by the flag decoder 19, which triggers interpolation. This is because picture data which is too old, if used unchecked, loses its correlation to other picture data and hence lowers the degree of recognition of reproduced pictures.

The foregoing description applies to digital VTR's having a single reproduction system. If two reproduction systems are incorporated as shown in FIG. 14, the newer of the two streams of picture data reproduced therefrom may be selected for picture reproduction. This scheme enhances the degree of reproduced picture recognition appreciably.

As shown in FIG. 14 this magnetic head device has four recording magnetic heads 3 and also two independently provided reproduction systems. That is, four magnetic heads make up a first reproduction system 4, close to which is located a separate second reproduction system 5.

FIG. 15 is a block diagram of a prior art picture enhancing circuit 10 that utilizes the rotating magnetic head device of FIG. 14. As shown in FIG. 15, the picture recognition enhancing circuit 10 comprises first and second enhancing circuits 10A and 10B each of which has a basic construction the same as that in FIG. 11. In this example, the reproduced outputs from the first and second reproduction systems 4 and 5 enter terminals 11 and 21, respectively. From the terminals, the reproduced outputs are written to field memories 14 and 24 in units of sync blocks, the picture data in the outputs being later read therefrom in the same units.

When read from the field memories 14, 24, the picture data is supplied to a changeover switch 31 for selection of the most recent picture data within the same sync block. The picture data thus selected serves as the data for picture reproduction.

The changeover switch 31 works as follows: The sync flag of the same sync block from the sync flag memories 17 and 27 are fed to a flag comparator 32 and a flag decoder 33. The flag comparator detects the sync flag having the smaller of the two values (the detected flag indicates the sync block containing the most recent picture data). The detected flag activates the changeover switch 31 so as to select the most recent picture data from among the picture data coming from the field memories 14 and 24.

The flag decoder 33 compares the sync flag value selected on the basis of the detected flag with the above-mentioned reference value. If the detected flag is found to exceed the reference value, the interpolation circuit 15 is activated to interpolate the picture data.

The system of FIG. 15, which reproduces pictures always on the basis of the most recent picture data, provides a more enhanced degree of reproduced picture recognition than the constitution of FIG. 11.

However, these prior art setups have a major disadvantage. The system of FIG. 11 requires the memory 17 in which to retain sync flags, while that of FIG. 15 needs two such memories. Although these memories 17 and 27 are required to have only limited amounts of memory capacity, the comparable small-capacity memories are difficult to procure on today's memory market. Manufacturers are thus forced to utilize commercially available memories that have a far greater capacity than is actually needed which is a significant waste of resources.

OBJECTS AND SUMMARY OF THE INVENTION

It is therefore an object of the present invention to provide a picture recognition enhancing circuit that eliminates the need for sync flag memories while still providing processing capabilities comparable to those offered by systems with such memories.

In achieving the foregoing and other objects of the invention and according to one aspect thereof, there is provided an apparatus for processing digital data comprising:

input means for providing an input digital signal including block data and address data, the address data being associated with said block data, said block data comprising sync data and word data;

storing means connected to said input means for storing in a field memory said block data from said input means according to said address data associated with said block data, each stored block data comprising the word data and associated sync data and said sync data of said block data being preset on storage;

read means for reading the word data from said field memory;

rewrite means for rewriting in response to a reading operation by said read means of said word data said sync data stored in said field memory associated with the word whereby the stored sync data is indicative of the number of times the associated word data has been read;

processing means connected to said field memory for processing said read word data and outputting it;

control means for controlling the output operation so that word data processed by said processing means is selectively provided as an output data instead of said word data from said field memory according to said stored sync data associated with said read word data.

The apparatus is particularly suitable as a picture enhancing circuit for improving the quality of reproduced pictures by enhancing the degree of recognition of the pictures acquired in variable speed reproduction. It may comprise reproducing means for reproducing a field signal made of a field containing a plurality of the sync blocks each constituted by the sync data and picture data as the word data. In accordance with invention the image data including the sync data is written in the field memory and the sync data is reset, e.g. to zero, on storage, i.e. either before, at or just after storage. When the image data is read the associated sync data is rewritten, e.g. incremented, so as to be indicative of the number of times that data has been read. If the data has been used before too often, it can be replaced, e.g. by interpolation from newer data, to avoid including uncorrelated picture data in the output. The sync data can be rewritten, e.g. incremented, before, during or after reading of the associated data and is reset only when new data is written to the memory.

Thus according to the invention, the sync data in the sync block double as a sync flag because after the sync detection circuit 12 has detected the sync data inserted in the sync block, the sync data becomes unnecessary. Thus the invention makes a positive use of the sync data as the sync flag when that data is no longer needed.

Illustrative embodiments of the invention will now be described in detail with reference to the accompanying drawings.

BRIEF DESCRIPTION OF THE DRAWINGS:

FIG. 1 is a block diagram of a picture enhancing circuit of a first embodiment of the invention;

FIG. 2 is a view showing the construction of a typical sync block;

FIG. 4A–B are a set of views illustrating another field memory used both as a picture data memory and as a sync flag memory according to the invention;

FIG. 12 is a view of a sync flag memory for use with the prior art picture enhancing circuit;

FIG. 13 is a view of another sync flag memory for use with the prior art picture enhancing circuit;

DESCRIPTION OF PREFERRED EMBODIMENTS

Figure 9:
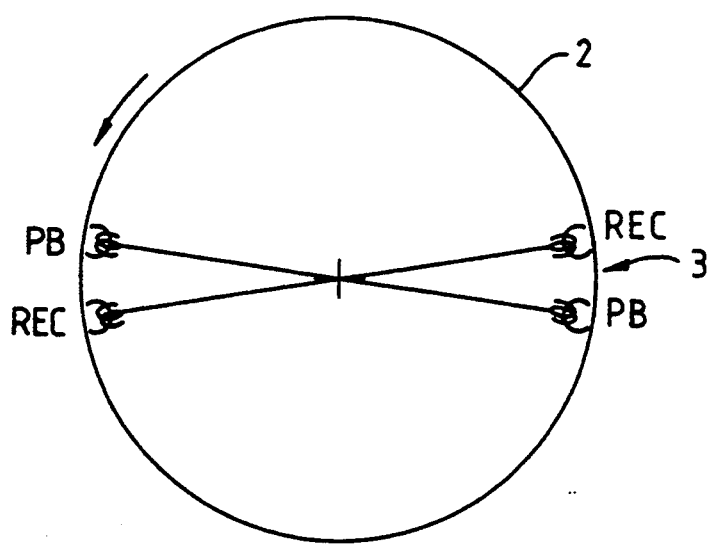
FIG. 9 is a view of a typical magnetic head device of the digital VTR.
Figure 10:
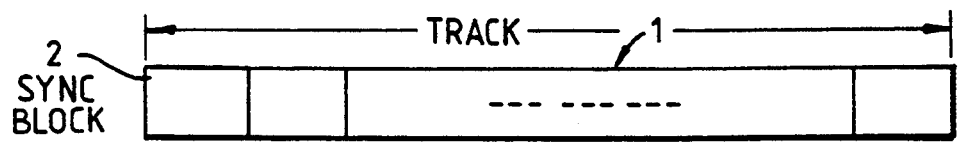
FIG. 10 is a view showing the structure of a field signal used by the digital VTR.

FIG. 1 is a block diagram of a first embodiment of a picture enhancing circuit 10 of the invention which uses a single reproduction system with the rotating magnetic head device of FIG. 9.

As mentioned above the field signal recorded on each track contains a plurality of sync blocks and as shown in FIG. 2 each sync block includes sync data SYNC, picture data DATA that contains an ID code, and a parity code PARITY. With one inner code block (ID, DATA, PARITY) constituting one sync block, error correction is accomplished using the data within each block.

Figures 3A, 3B, 3C, 6:
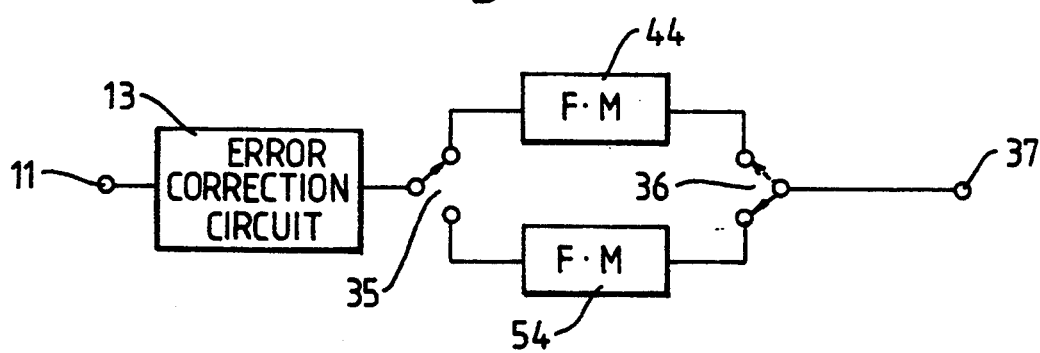
FIG. 3A–C are a set of views depicting a field memory used both as a picture data memory and as a sync flag memory according to the invention.
FIG. 6 is a view showing a circuit arrangement according to the invention.
Figure 11:
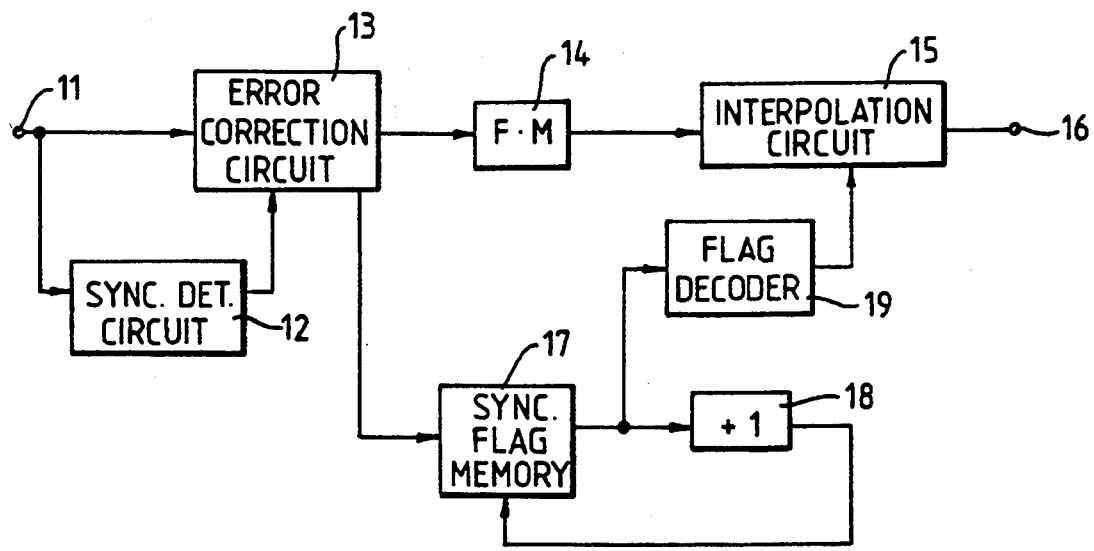
FIG. 11 is a block diagram of a typical prior art picture enhancing circuit.
Figure 14:
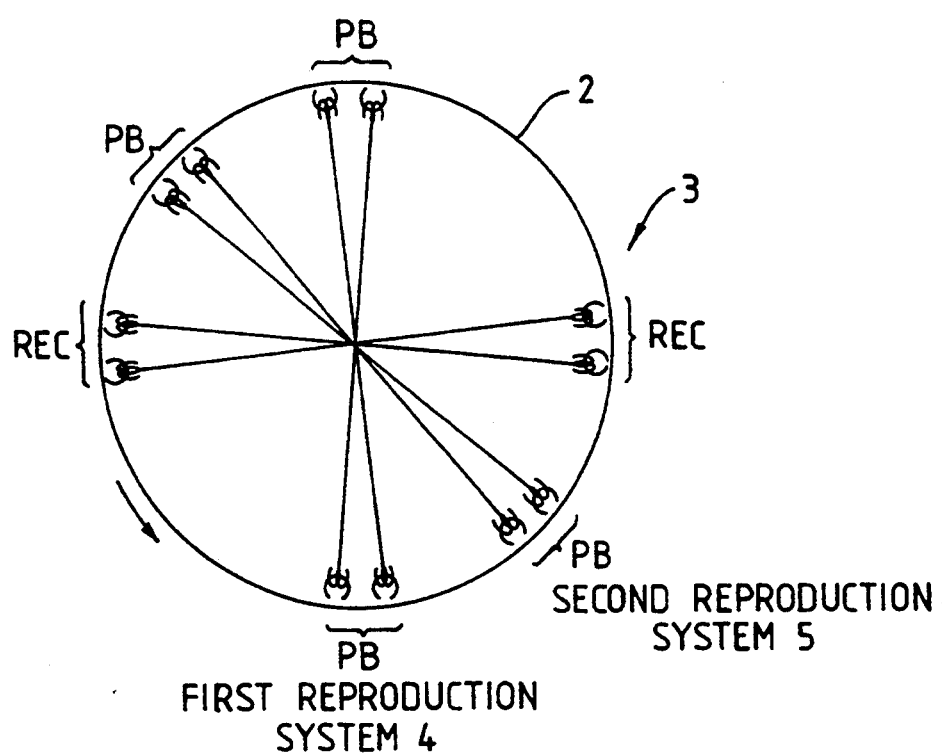
FIG. 14 is a view of another typical magnetic head device of the digital VTR.

The construction of FIG. 1 is similar to that of FIG. 11, except that the entire sync block corrected for error is placed in the corresponding area in the field memory 14. Conventionally, the picture data alone is stored in the memory as shown in FIG. 3A. With the first embodiment of the invention, by contrast, not only the picture data in the sync block but also the sync data and the ID data attached thereto are stored in the same sync block memory area, as illustrated in FIG. 3B. Alternatively, only the sync data and picture data may be stored in the memory area as shown in FIG. 3C. This requires using a field memory 14 whose capacity is slightly larger than the comparable prior art memory.

With the present invention the sync data written to the field memory 14 is used as the sync flag because the sync data after detection by the sync detection circuit 12 from the sync block becomes unnecessary. Thus with the present invention that data is utilized productively as the sync flag. Thus sync detection is followed by the setting of all bits in the sync data (8-bit data) to 0. The preset sync data is written to the field memory 14 as the sync flag alone with the picture data, as depicted in FIG. 4A.

Meanwhile, when picture data is read from the field memory 14, the sync flag stored in the same sync block memory area as the picture data is also read therefrom. After read-out, the picture data is fed to the interpolation circuit 15 and the sync flag is supplied to both the incrementer 18 and the flag decoder 19.

The incrementer 18 increments the value of the sync flag by 1. The updated sync data is again written to the same memory area (see FIG. 4B). The flag decoder 19 compares the sync flag with the reference value in the same manner as with the prior art system. If the flag value is found to be below the reference value, the interpolation circuit 15 is disabled so as to let the picture data pass therethrough unprocessed. If the flag value is found to exceed the reference value, the picture data is interpolated by the same interpolation process as in the prior art before output.

As described, a somewhat expanded memory area arrangement is provided in the field memory 14 to accommodate picture data along with sync data, the latter being reset and used after its primary use of detection as sync flags. This arrangement eliminates the need for a separate sync flag memory while still preserving the sync flags which can indicated how old given items of picture data are.

Figure 5:
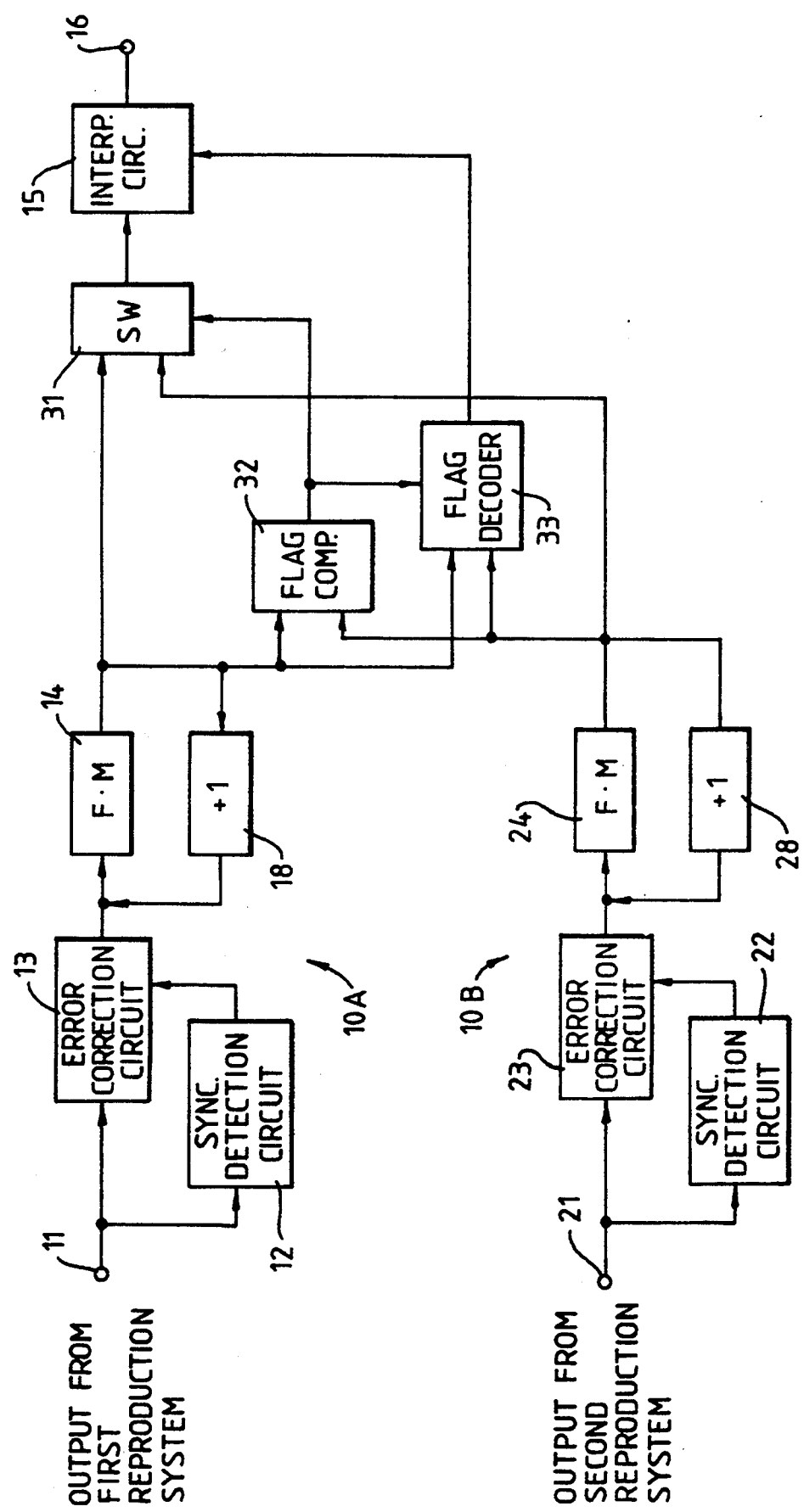
FIG. 5 is a block diagram of a picture enhancing circuit of a second embodiment of the invention.
Figure 15:
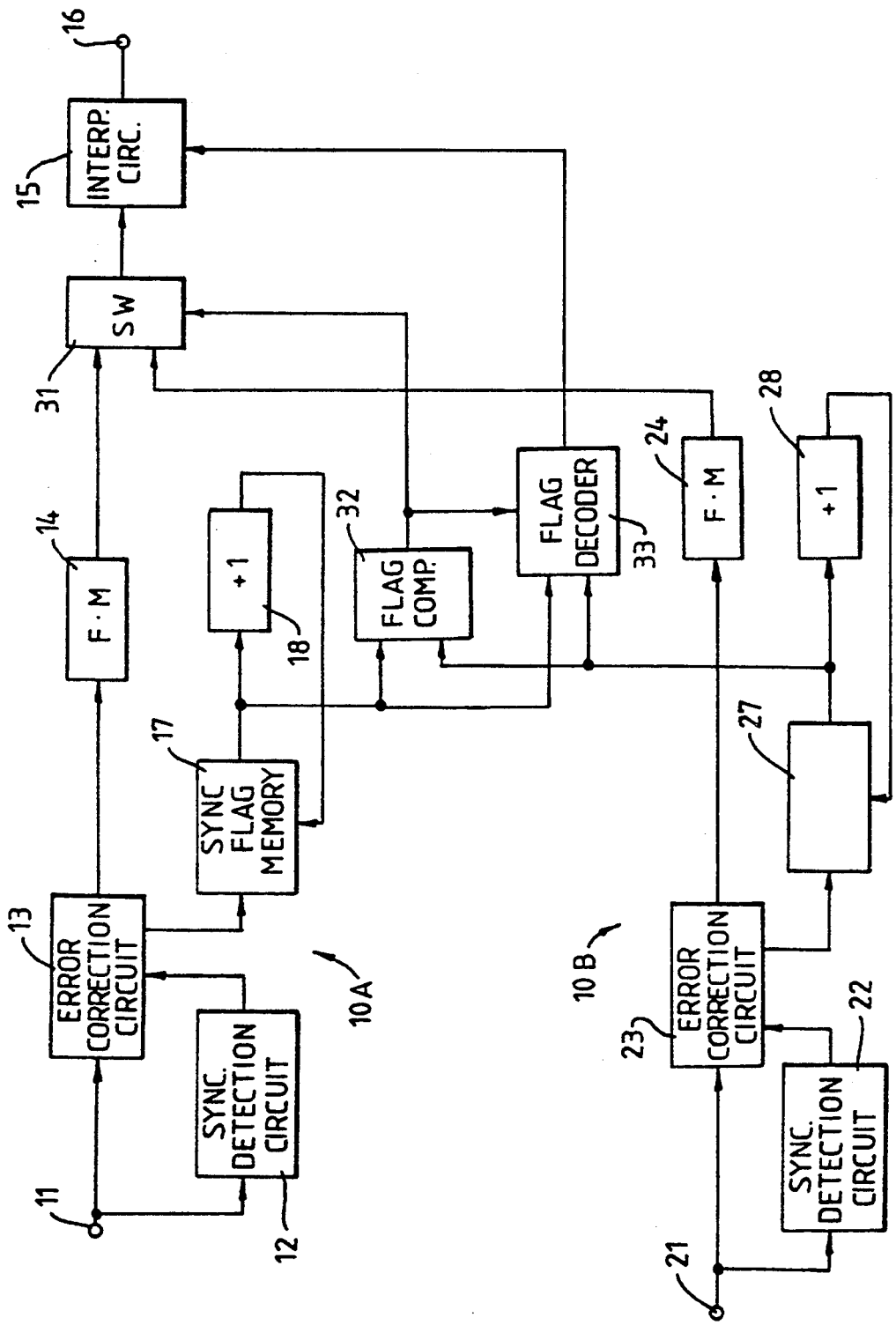
FIG. 15 is a block diagram of another prior art picture enhancing circuit that utilizes the rotating magnetic head device of FIG. 14.

FIG. 5 is a block diagram of a second embodiment of a picture recognition of the invention. This embodiment comprises a dual reproduction system whose basic construction is the same as that of FIG. 15. The field memories 14 and 24 provided respectively in the first and second enhancing circuits 10A and 10B double as sync flag memories as in the first embodiment above. The two sets of picture data output by the two enhancing circuits eventually reach the changeover switch 31. Based on the output from the flag comparator 32, the changeover switch 31 selects the more recent of the two sets of picture data. The changeover switch 31 then controls the operating status of the interpolation circuit 15 in accordance with the output from the flag decoder 33.

The embodiments of FIGS. 1 and 5 use the field signal in which error correction is accomplished within each sync block, as shown in FIG. 2. The invention may also be applied to digital VTR's wherein the shuffling of data or of error-corrected blocks extends over a plurality of fields. One such digital VTR records and reproduces the field signal containing an error correction code of, say a product code structure.

The reproduction system in such a case contains field memories 44 and 54 generally having a total of two fields each, as depicted in FIG. 6. The writing to and reading from the field memories 44 and 54 are switched according to the type of reproduction mode for the shuffling of data or for outer code-based error correction.

In the normal reproduction mode, a pair of changeover switches 35 and 36 in FIG. 6 are switched in an alternating manner. If the same write operation for the normal reproduction mode were performed in a variable speed reproduction mode such as a shuttle mode, 50 percent of the total data reproduced by the magnetic head would be stored in the field memories 44 and 54. During the read operation, the field memories would be read alternately in units of fields for the alternate output of half the total data amount. This would deteriorate the correlation among the picture data and would lower the degree of reproduced picture quality. This is circumvented by a third embodiment of the invention which will be described below.

Figure 7:
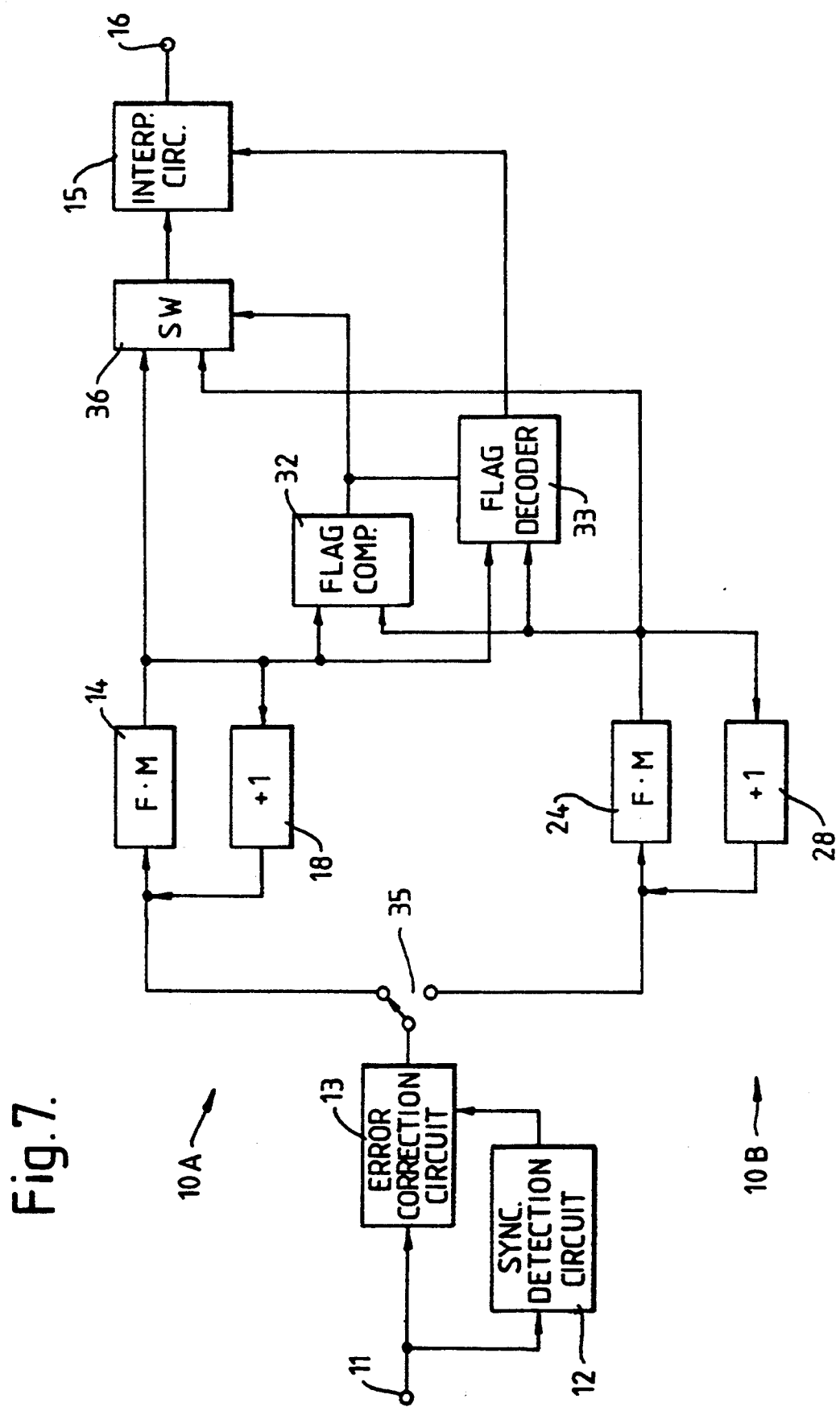
FIG. 7 is a block diagram of a picture enhancing circuit of a third embodiment of the invention.
Figure 8:
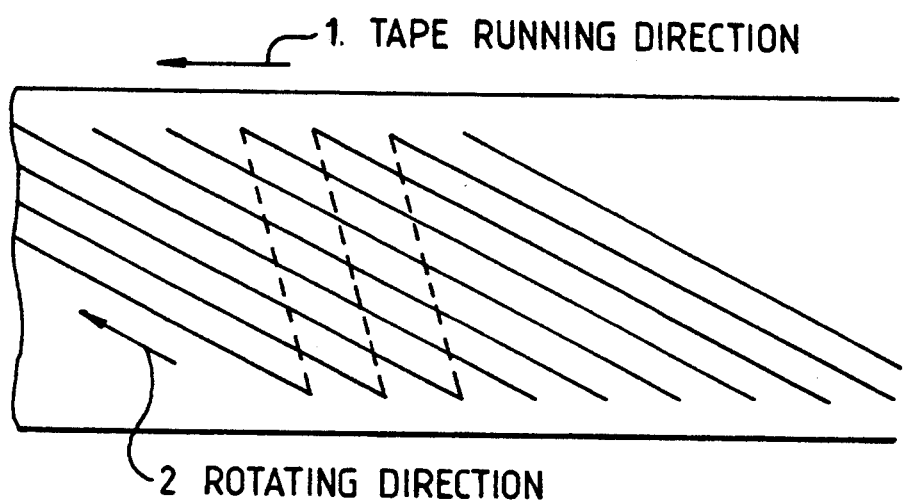
FIG. 8 is a view of track patterns in connection with the digital VTR.

FIG. 7 is a block diagram of a third embodiment of a picture enhancing circuit of the invention. In this embodiment, the changeover switch 36 is identical in structure to the changeover switch 31 of FIG. 5. The constitution of the third embodiment is similar to that of FIG. 5 in that the embodiment comprises the first and second enhancing circuits 10A and 10B. Error-corrected field signals are switched in units of fields both in the normal reproduction mode and in the variable speed reproduction mode. Because the changeover switch 36 selects the most recent picture data, all data picked up by the magnetic head may be used for picture reproduction in units of fields.

Since pictures are reproduced in units of fields using the continuously updated data, the degree of reproduction picture recognition is enhanced significantly. (In the example of FIG. 6, pictures are reproduced in units of frames.) The changeover switch 35 is controlled in the same manner with respect to the field memories 44 and 54 regardless of the type of reproduction mode in effect. This eliminates the possibility of reproduced pictures getting disrupted upon mode changeover.

As described, the picture recognition enhancing circuit according to the invention first checks to see if a given sync block read from the field memory is updated by the data of a newly reproduced sync block, the data in the field memory being read therefrom in units of sync blocks. If the sync block is found yet to be updated, the contents of the sync data alone are updated every time picture data is read from the field memory. The updated sync data is again written to the field memory. This allows the field memory to be used both as the picture data memory and as the sync flag memory. This means there is no need for a separate sync flag memory required of the prior art picture recognition enhancing circuit significantly reducing manufacturing cost.

What is claimed is

1. An apparatus for processing digital data comprising:
   input means for providing an input digital signal including a plurality of data blocks and address data therefor, said address data being associated with each of said data blocks, and each said data block comprising sync data and word data;
   storing means including a field memory and connected to said input means for storing said data blocks from said input means in said field memory according to said address data associated with said block data, each data block stored in said field memory being formed of word data and sync data having been preset to a predetermined value upon storage in said field memory;
   means for incrementing said sync data in response to a reading operation of said field memory, whereby each time one of said data blocks is read from said field memory said predetermined value of said sync data associated with said one data block read from said field memory is incremented and written back into said field memory, the value of said stored sync data being indicative of the number of times the associated word data has been read;
   processing means connected to said field memory for processing said read word data and outputting it;
   control means for controlling the output operation so that word data processed by said processing means is selectively provided as output data instead of said word data from said field memory according to said stored sync data associated with said read word data.

2. Apparatus according to claim 1, wherein said control means includes comparing means for comparing said sync data associated with said read word data with a threshold value and for controlling said output operation to selectively provide said processed word data as an output data upon exceeding said threshold value.

3. Apparatus according to claim 1, wherein said processing means includes interpolating means for interpolating said word data read from said field memory.

4. Apparatus according to claim 1, wherein said input means is adapted to receive a digital signal and includes sync detecting means for detecting said sync data inserted in each of said plurality of data blocks of said received signal.

5. Apparatus according to claim 4, wherein each of said data blocks further comprises error check data, and wherein said input means includes error correction means for correcting said word data of said data blocks detected by said sync detecting means using said error check data.

6. Apparatus according to claim 1, wherein said storing means stores said address data from said input means with said word data and said sync data in said field memory.

7. Apparatus according to claim 1, further comprising reproducing means having first and second reproducing heads for reproducing said digital signal from a recording medium and providing it to the input means and wherein said storing means includes first and second field memories for storing said data blocks each comprising respective first and second sync data and first and second word data received respectively from said first and second reproducing heads, and said means for incrementing comprises respective first and second incrementing means for incrementing and rewriting said first and second sync data stored in said first and second field memories in response to respective reading operations in said first and second field memories; and further comprising comparing means for comparing together first and second sync data stored in first and second field memories associated with data read out of said first and second field memories, and selecting means for selectively providing said data read from one of said first and second field memories in accordance with the result of the comparison provided form said comparing means.

8. Apparatus according to claim 7, wherein said selecting means selects from said first and second field memories the data which has most recently been reproduced.

9. Apparatus according to claim 7 further comprising sync detecting means for detecting sync data inserted in said digital signal reproduced by said first and second reproducing heads.

10. Apparatus according to claim 9, wherein each of said data blocks further comprises error check data, and wherein said apparatus further comprises first and second error correction means for correcting said data blocks by using said error check data detected by said detecting means and providing error-corrected word data and sync data to said first and second field memories.

11. Apparatus according to claim 8, wherein said processing means includes interpolating means for interpolating said word data read from said memory means.

12. Apparatus according to claim 1 further comprising reproducing means for reproducing said digital signal from a recording medium and wherein first and second field memories are provided, said storing means comprising a switch for storing said block data alternately in said first and second field memories, and said rewriting means comprises respective first and second rewriting means for rewriting said first and second sync data stored in said first and second field memories in response to respective reading operations in said first and second field memories; and further comprising comparing means for comparing together first and second sync data stored in first and second field memories associated with data read out of said first and second field memories, and selecting means for selectively providing said data read from one of said first and second field memories in accordance with the result of the comparison provided from said comparing means.

13. Apparatus according to claim 12 wherein said selecting means selects from said first and second field memories the data which has most recently been reproduced.

14. Apparatus according to claim 13 further comprising sync detecting means connected between said reproducing means and said switch, for detecting sync data in said reproduced signal.

15. Apparatus according to claim 14 further comprising error correcting means connected between said reproducing means and said switch and receiving the output of said sync detection means for correcting errors in the reproduced digital data to produce corrected digital data and supplying the corrected digital data to said switch.

* * * * *